United States Patent [19]
Ishikawa et al.

[11] Patent Number: 5,481,427
[45] Date of Patent: Jan. 2, 1996

[54] MODE SELECTOR MECHANISM FOR CASSETTE TAPE RECORDER INCLUDING IMPROVED CAM GEAR AND DRIVE SELECTING MECHANISM

[75] Inventors: Jun Ishikawa; Michio Kawashima, both of Tokyo; Kazuhiro Itoh, Saitama, all of Japan

[73] Assignee: Sony Corporation, Tokyo, Japan

[21] Appl. No.: 187,057

[22] Filed: Jan. 27, 1994

[30] Foreign Application Priority Data

Jan. 29, 1993 [JP] Japan ................... 5-014172

[51] Int. Cl.$^6$ ............ G11B 15/02; G11B 15/44
[52] U.S. Cl. ........................... 360/137; 360/96.3
[58] Field of Search ................. 360/137, 105, 360/96.3, 74.1; 242/356, 356.3

[56] References Cited

U.S. PATENT DOCUMENTS

| | | | |
|---|---|---|---|
| 4,336,560 | 6/1982 | Mtsumoto | 360/137 |
| 4,385,205 | 5/1983 | Jacobson | 360/96.4 |
| 4,635,068 | 1/1987 | Jacobson | 360/74.2 |
| 4,704,643 | 11/1987 | Matsuoka et al. | 360/71 |
| 4,819,891 | 4/1989 | Kamijo | 360/96.4 |
| 4,930,720 | 6/1990 | Hwang | 360/96.5 |
| 5,211,066 | 5/1993 | Koga et al. | 360/96.3 |
| 5,260,844 | 11/1993 | Koga et al. | 360/137 |
| 5,295,639 | 3/1994 | Kurokawa et al. | 360/96.3 |

FOREIGN PATENT DOCUMENTS

| | | |
|---|---|---|
| 0390433 | 10/1990 | European Pat. Off. . |
| 0488714 | 6/1992 | European Pat. Off. . |
| 2182193 | 5/1987 | United Kingdom . |

*Primary Examiner*—Stuart S. Levy
*Assistant Examiner*—Brian E. Miller
*Attorney, Agent, or Firm*—Jay H. Maioli

[57] ABSTRACT

A mode selector mechanism for use in a cassette tape recorder includes a mode selector lever, a cam gear, an operating mechanism, a motor, a selecting mechanism, and a tape transport assembly. The tape transport assembly transports the cassette tape in a selected one of at least three operating modes including a forward playback mode, a fast-forward mode, and a rewinding mode. The cam gear moves the mode selector lever in a direction to a position corresponding to the selected operating mode where the mode selector lever is stopped. The operating mechanism is angularly movable in response to movement of the mode selector lever, for switching between different force transmitting paths of the tape transport assembly depending on the selected operating mode, and preventing the mode selector lever from moving in directions perpendicular to the direction in which the mode selector lever moves. The selecting mechanism selectively supplies the drive forces from the motor to the cam gear or to the tape transport assembly depending on the direction in which the motor rotates.

8 Claims, 9 Drawing Sheets

MODE SELECTOR MECHANISM FOR CASSETTE TAPE RECORDER INCLUDING IMPROVED CAM GEAR AND DRIVE SELECTING MECHANISM

BACKGROUND OF THE INVENTION

1. Field of the Invention

The present invention relates to a mode selector mechanism for use in an apparatus for recording and/or reproducing information on and/or from a tape-like recording medium, and more particularly to such a mode selector mechanism which includes a mode selector lever for selecting one, at a time, of different modes of an apparatus for recording and/or reproducing information on and/or from a tape-like recording medium, such as a cassette tape recorder.

2. Description of the Related Art

Various cassette tape recorders that are presently available have an automatic reverse mechanism for automatically reversing a cassette tape. Usually, the cassette tape recorders are operable in one, at a time, of four operating modes including a forward playback (FWD) mode, a reverse playback (REV) mode, a fast-forward (FF) mode, and a rewinding (REW) mode. The cassette tape recorders have hub drive shafts, a magnetic head, and pinch rollers which rotate and move in different manners in those operating modes.

One type of mode selector mechanism for selecting one of the four operating modes at a time will be described below. The mode selector mechanism has a mode selector lever which can slide in response to rotation of a cam gear and stop selectively in four positions corresponding to the FWD, REV, FF, and REW modes. The mode selector mechanism also has an operating lever that can operate by being pushed by the mode selector lever. When the operating lever operates in response to sliding movement of the mode selector lever, the transmission path from the cam gear, the angular displacement of the cam gear, and the rotational speed of the cam gear are varied or switched to rotate the hub drive shafts and move the magnetic head and the pinch rollers differently depending on the operating mode that is selected.

Since switching operation of the cam gear is switched depending on the selected operating mode in response to sliding movement of the mode selector lever, the mode selector lever is required to stop highly accurately in each of the four positions corresponding to the respective operating modes. However, the mode selector lever tends to be displaced from the position where it has stopped, due to forces that are applied from the operating lever to the mode selector lever. To prevent the mode selector lever from being displaced off the position, it is necessary to use various mechanism components including a lock lever to lock the mode selector lever and a return spring for returning the mode selector lever. Therefore, the mode selector mechanism is relatively complex in structure, expensive owing to many parts used, manufactured in a large number of manufacturing steps, and low in reliability.

OBJECTS AND SUMMARY OF THE INVENTION

It is, therefore, an object of the present invention to provide a mode selector mechanism for use in an apparatus for recording and/or reproducing information on and/or from a tape-like recording medium, which mode selector mechanism will solve the above problems.

According to the present invention, there is provided a mode selector mechanism for use in an apparatus for recording and/or reproducing information on and/or from a tape-like recording medium, comprising a mode selector lever stoppable in a position corresponding to a selected one of a plurality of operating modes of the apparatus, a cam gear rotatable for moving the mode selector lever in a direction to the position corresponding to the selected one of the operating modes, and an operating mechanism angularly movable in response to movement of the mode selector lever, for switching between different force transmitting paths of a tape transport assembly of the apparatus depending on the selected one of the operating modes, and preventing the mode selector lever from moving in directions perpendicular to the direction in which the mode selector lever moves.

Since the mode selector lever is prevented from moving in the directions perpendicular to the direction in which the mode selector lever moves, the mode selector lever is reliably prevented from being positionally displaced when it is in the position corresponding to the selected operating mode. Inasmuch as no special lock mechanism is required to lock the mode selector lever against positional displacement, the number of parts making up the mode selector mechanism is relatively small. The mode selector mechanism is also reliable in operation as it is reliably simple in structure.

The above and other objects, features, and advantages of the present invention will become apparent from the following description of an illustrative embodiment thereof to be read in conjunction with the accompanying drawings, in which like reference numerals represent the same or similar objects.

DETAILED DESCRIPTION OF THE PREFERRED EMBODIMENT

A mode selector mechanism for use in an apparatus for recording and/or reproducing information on and/or from a tape-like recording medium in accordance with the present invention will be described below as being incorporated in a cassette tape recorder having an automatic reverse function.

Figure 1:
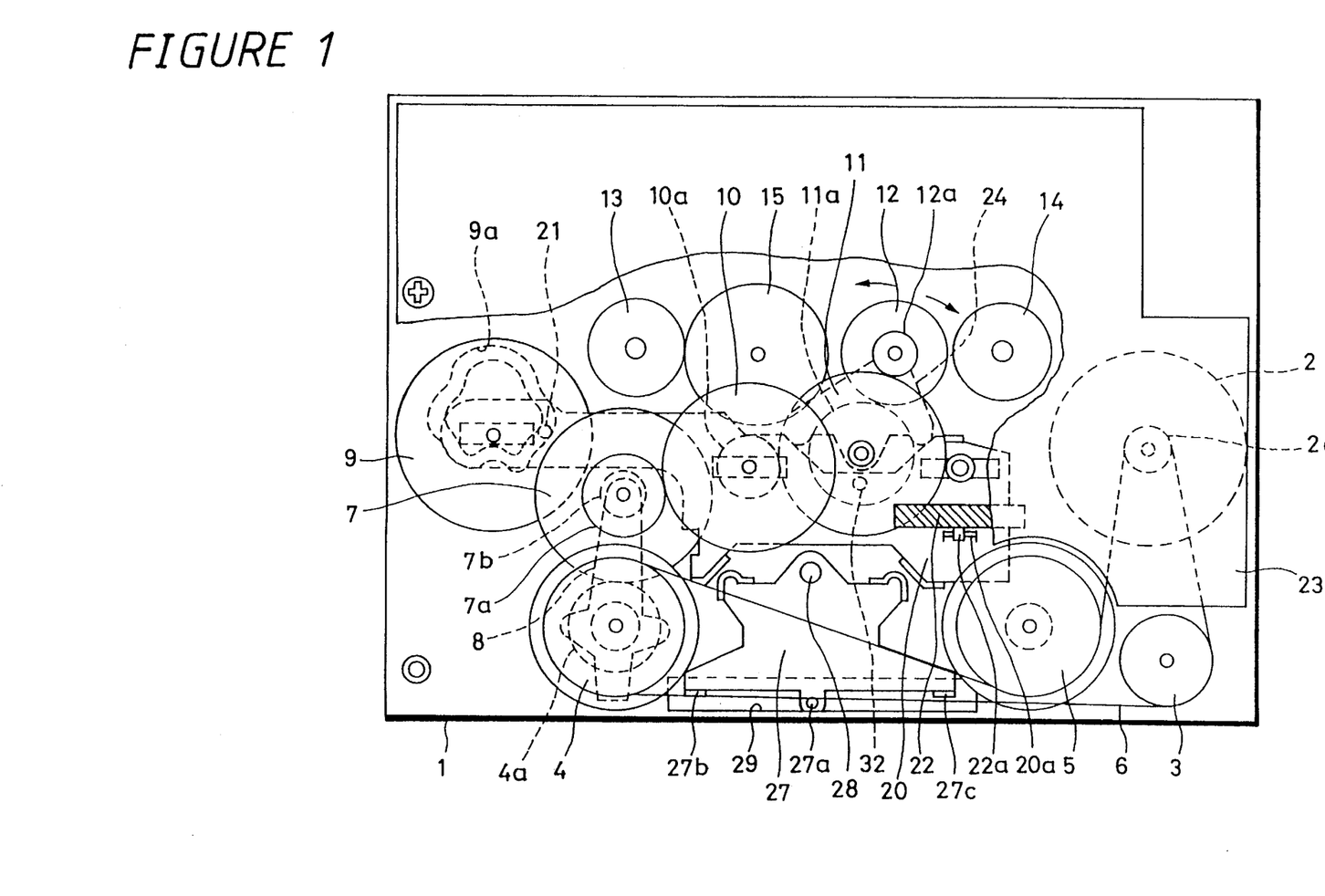
FIG. 1 is a plan view of a tape transport mechanism in a cassette tape recorder which incorporates the principles of the present invention.
Figure 2:
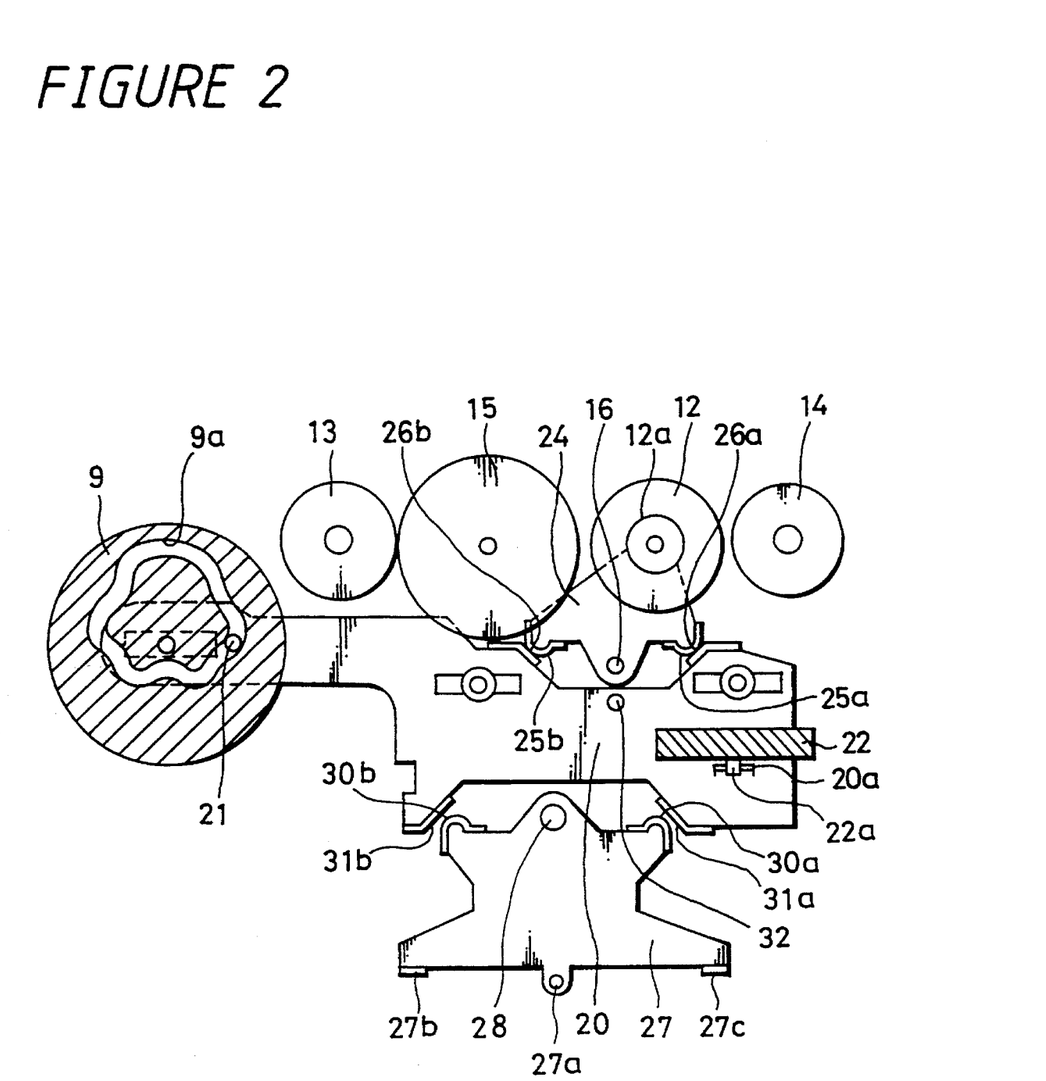
FIG. 2 is a plan view of a mode selector mechanism in the tape transport mechanism shown in FIG. 1.

FIG. 1 shows a tape transport mechanism mounted on the reverse side of a mechanical chassis 1 in a cassette tape recorder of the automatic reverse type. FIG. 2 shows a mode selector mechanism in the tape transport mechanism. The tape transport mechanism shown in FIGS. 1 and 2 is shown as being stopped in a position for illustrative purpose only, and will not be stopped in such a position when it actually operates.

In FIG. 1, the tape transport mechanism includes a reversible motor 2 as a drive power unit. The motor 2 has a rotatable shaft on which a pulley 2a is mounted. A belt 6 is trained around the pulley 2a, an idle pulley 3, and a pair of laterally spaced flywheels 4, 5 such that the flywheels 4, 5 rotate in opposite directions when the motor 2 is energized. The flywheels 4, 5 rotate in unison with respective FWD and REV capstans that project on the face side (not shown in FIG. 1) of the mechanical chassis 1.

The flywheel 4 has a gear 4a on its lower surface which is held in mesh with a movable gear 7 that is pivotally supported on a distal end of a rocking arm 8 which is mounted for angular movement about the bearing of the flywheel 4. Depending on the direction in which the flywheel 4 rotates, the movable gear 7 is brought into selective mesh with a cam gear 9 or a transmission gear 10.

More specifically, the movable gear 7 has a first small-diameter gear 7a integrally on its upper surface and a second small-diameter gear 7b integrally on its lower surface, the second small-diameter gear 7b being smaller in diameter than the first small-diameter gear 7a. When the flywheel 4 is rotated clockwise as shown in FIG. 1, the movable gear 7 is angularly moved to the right causing the first small-diameter gear 7a to mesh with the transmission gear 10. Conversely, when the flywheel 4 is rotated counterclockwise as shown in FIG. 1, the movable gear 7 is angularly moved to the left causing the second small-diameter gear 7b to mesh with the cam gear 9. The cam gear 9 serves to operate the mode selector mechanism for switching gears as described later on.

The transmission gear 10 has a small-diameter gear 10a integrally on its lower surface which is held in mesh with a speed-change gear 11 that is in turn held in mesh with a movable gear 12. The speed-change gear 11 will be described in detail later on.

The movable gear 12 can be moved by the mode selector mechanism to transmit rotation selectively to a takeup hub shaft and a supply hub shaft (not shown) which project on the face side of the mechanical chassis 1. The takeup hub shaft and supply hub shaft can rotate in unison with gears 13, 14, respectively. The gear 13 is held in mesh with a transmission gear 15. When the movable gear 12 is angularly moved to the left as shown in FIGS. 1 and 2, the movable gear 12 meshes with the transmission gear 15. When the movable gear 12 is angularly moved to the right as shown in FIGS. 1 and 2, the movable gear 12 meshes with the gear 14.

The speed change gear 11 will now be described below with reference to FIGS. 6, 7A, and 7B. A small-diameter auxiliary gear 11a is rotatably disposed below a lower surface of the speed-change gear 11 in coaxial relationship thereto. The small-diameter auxiliary gear 11a is vertically movably supported on a pivot shaft 16 mounted on the mechanical chassis 1. The auxiliary gear 11a is rotatable in unison with the speed-change gear 11 due to the friction of a compression coil spring 17 which acts between the speed-change gear 11 and the auxiliary gear 11a.

The speed-change gear 11 is normally biased to move downwardly by a compression coil spring 19 which is interposed between the auxiliary gear 11a and a retaining washer 18 which is fitted over the upper distal end of the pivot shaft 16. When a mode selector lever of the mode selector mechanism is operated, the speed-change gear 11 is lifted against the biasing force of the compression coil spring 19. When the speed-change gear 11 is in a lowered position, as shown in FIG. 7A, the auxiliary gear 11a is held in mesh with the movable gear 12 at a smaller gear ratio. When the speed-change gear 11 is in a lifted position, as shown in FIG. 7B, it meshes with a small-diameter gear 12a which is formed integrally with the upper surface of the movable gear 12, at a greater gear ratio, for transmitting rotation of the speed-change gear 11 at a higher speed to the movable gear 12.

The mode selector mechanism will be described below. As shown in FIGS. 1 and 2, the mode selector mechanism includes a mode selector lever 20 disposed centrally on the mechanical chassis 1. In response to rotation of the cam gear 9, the mode selector lever 20 is slidable laterally for selecting one of the four FWD, REV, FF, and REW modes at a time. The cam gear 9 has a continuous cam groove 9a, and the mode selector lever 20 has a cam follower 21 in the form of a pin on an end thereof which movably engages in the cam groove 9a. When the cam gear 9 rotates, the cam follower 9a is pushed by an inner edge of the cam groove 9a to slide the mode selector lever 20.

The mode selector lever 20 can be stopped selectively in four positions which correspond respectively to the FWD, REV, FF, and REW modes. These four positions are detected by a slide switch 22 fixed to a printed-circuit board 23 which is mounted on the mechanical chassis 1 in covering relationship to the tape transport mechanism. The slide switch 22 has a trigger lever 22a fixed to an attachment 20a projecting from the mode selector lever 20. When the mode selector lever 20 slides, the trigger lever 22a of the slide switch 22 is moved thereby to detect the position of the mode selector lever 20.

Upon sliding movement of the mode selector lever 20, it angularly moves a first operating lever 24 and a second operating lever 27. When the first operating lever 24 is angularly moved, a gear transmission path is selected to transmit rotation to one of the takeup hub shaft and the supply hub shaft. When the second operating lever 27 is angularly moved, it moves a magnetic head and pinch rollers (not shown) that are mounted on the face side of the mechanical chassis 1.

The first operating lever 24 will first be described below. The first operating lever 24 is angularly movably mounted coaxially on the pivot shaft 16 of the speed-change gear 11. The first operating lever 24 has a pair of symmetrically positioned pressable edges 25a, 25b that are spaced from each other. The mode selector lever 20 has a pair of symmetrically positioned pressing edge members 26a, 26b that are spaced from each other and have respective inclined edges for pressing the pressable edges 25a, 25b, respectively.

When the mode selector lever 20 slides, the inclined edge of the pressing edge member 26a or 26b presses the pressable edge 25a or 25b for turning the first operating lever 24 about the pivot shaft 16. The movable gear 12 supported on the first operating lever 24 is thus angularly moved selectively into mesh with the transmission gear 15 which is associated with the takeup hub shaft and the gear 14 which is associated with the supply hub shaft.

The second operating lever 27 is mounted on the mechanical chassis 1 for angular movement about a pivot shaft 28. The second operating lever 27 has a pressing member 27a disposed on a central portion thereof and a pair of spaced pressing members 27b, 27c disposed respectively on opposite ends thereof. The pressing members 27a, 27b, 27c extend through a hole 29 defined in the mechanical chassis 1 and project on the face side thereof, and are associated with the magnetic head, a FWD pinch roller, and a REV pinch roller, respectively.

The second operating lever 27 has a pair of symmetrically positioned pressable edges 30a, 30b that are spaced from each other. The mode selector lever 20 has a pair of symmetrically positioned inclined pressing edge members 31a, 31b that are spaced from each other and have respective inclined edges for pressing the pressable edges 30a, 30b, respectively. Upon sliding movement of the mode selector lever 20, the inclined edge of the pressing edge member 31a or 31b presses the pressable edge 30a or 30b for turning the second operating lever 27 about the pivot shaft 28. Therefore, the central pressing member 27a moves the magnetic head, and the pressing member 27b or 27c moves the FWD pinch roller or the REV pinch roller.

Figure 6:
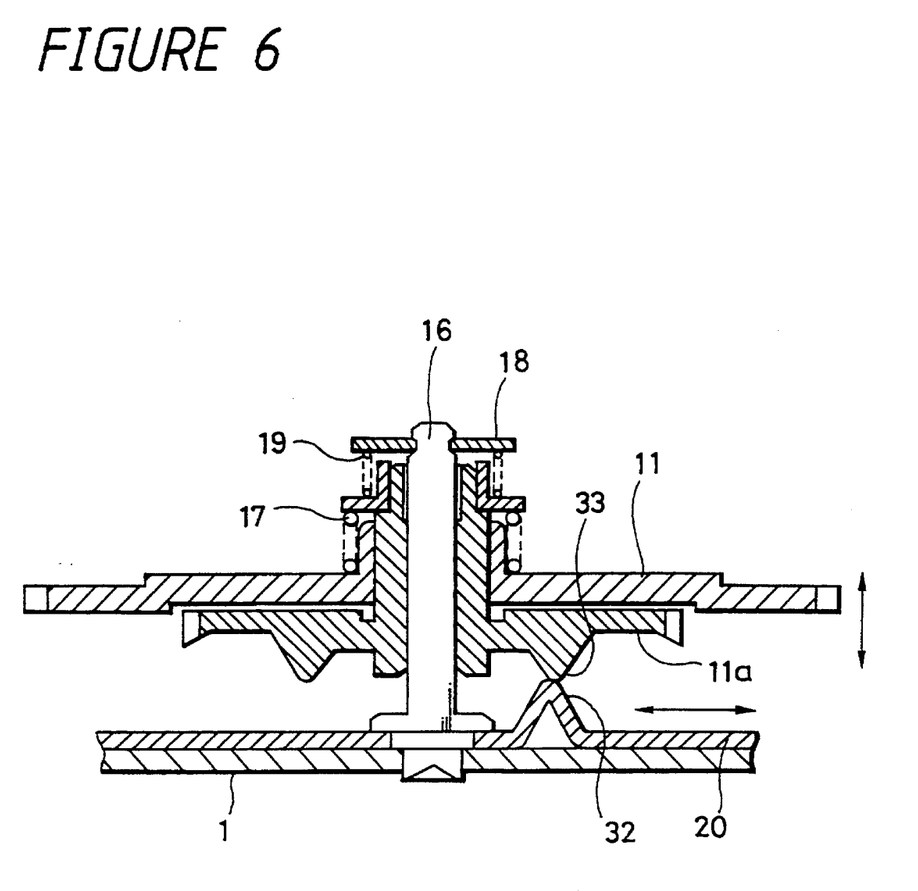
FIG. 6 is a vertical cross-sectional view of a speed-change gear and associated parts.
Figure 7A:
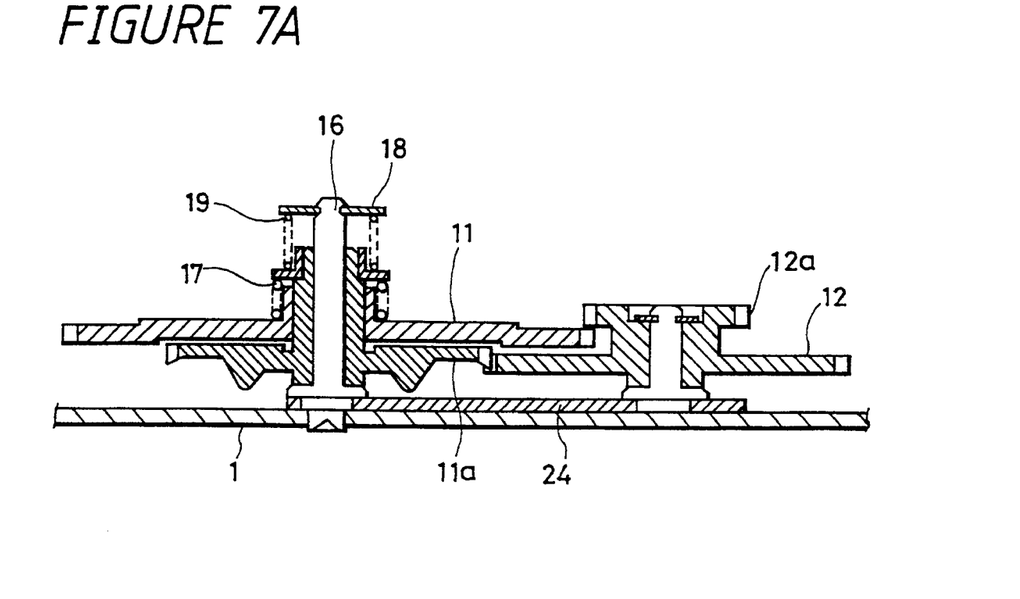
FIGS. 7A and 7B are vertical cross-sectional views illustrative off the manner in which the speed-change gear and associated parts are vertically moved, i.e., showing the speed-change gear in a lowered position and a lifted position, respectively.
Figure 7B:
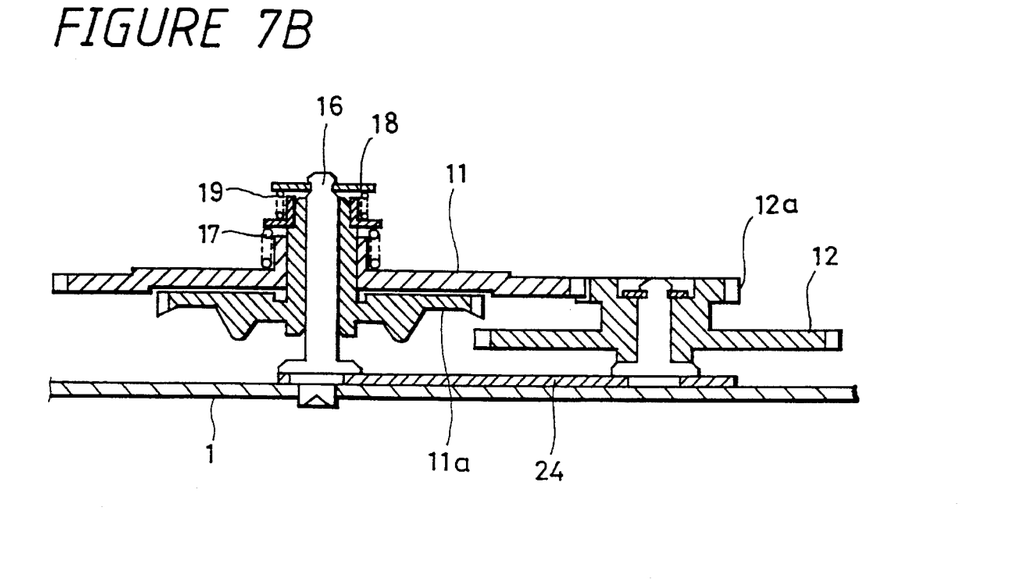

As shown in FIG. 6, the mode selector lever 20 has a conical tapered projection 32 positioned below and projecting upwardly toward the speed-change gear 11. The auxiliary gear 11a has a projection or ridge 33 projecting downwardly from its lower surface toward the mode selector lever 20 for engagement with the tapered projection 32. When the tapered projection 32 engages the ridge 33 upon sliding movement of the mode selector lever 20, the speed-change gear 11 is lifted together with the auxiliary gear 11a from the lowered position against the bias of the compression coil spring 19.

Operation of the tape transport mechanism and hence the mode selector mechanism will be described below.

In the cassette tape recorder, when any of mode control buttons corresponding to the FWD, REV, FF, REV modes is pressed, the motor 2 is energized to rotate its shaft in the reverse direction, i.e., counterclockwise in FIGS. 1 and 2, at first.

When the shaft of the motor 2 is rotated in the reverse direction, the flywheel 4 is rotated counterclockwise, rocking the movable gear 7 to the left thereby to bring the second small-diameter gear 7b into mesh with the cam gear 9. Therefore, the rotation of the motor 2 is transmitted through the belt 6, the flywheel 4, and the movable gear 7 to the cam gear 9, which is now rotated about its own axis. The rotation of the cam gear 9 causes the mode selector lever 20 to slide for selecting one of the FWD, REV, FF, REV modes which correspond to the pressed mode control button.

When the mode selector lever 20 has moved to the position corresponding to the selected mode as detected by the slide switch 22, the slide switch 22 supplies a detected signal to a controller (not shown) on the printed-circuit board 23, which immediately energizes the motor 2 to rotate its shaft in the normal direction, i.e., clockwise in FIGS. 1 and 2. As a result, the movable 7 is turned rightward into mesh with the transmission gear 10. At this time, the cam gear 9 stops rotating, and the mode selector lever 20 is stopped in the position corresponding to the selected mode.

Figure 3A:
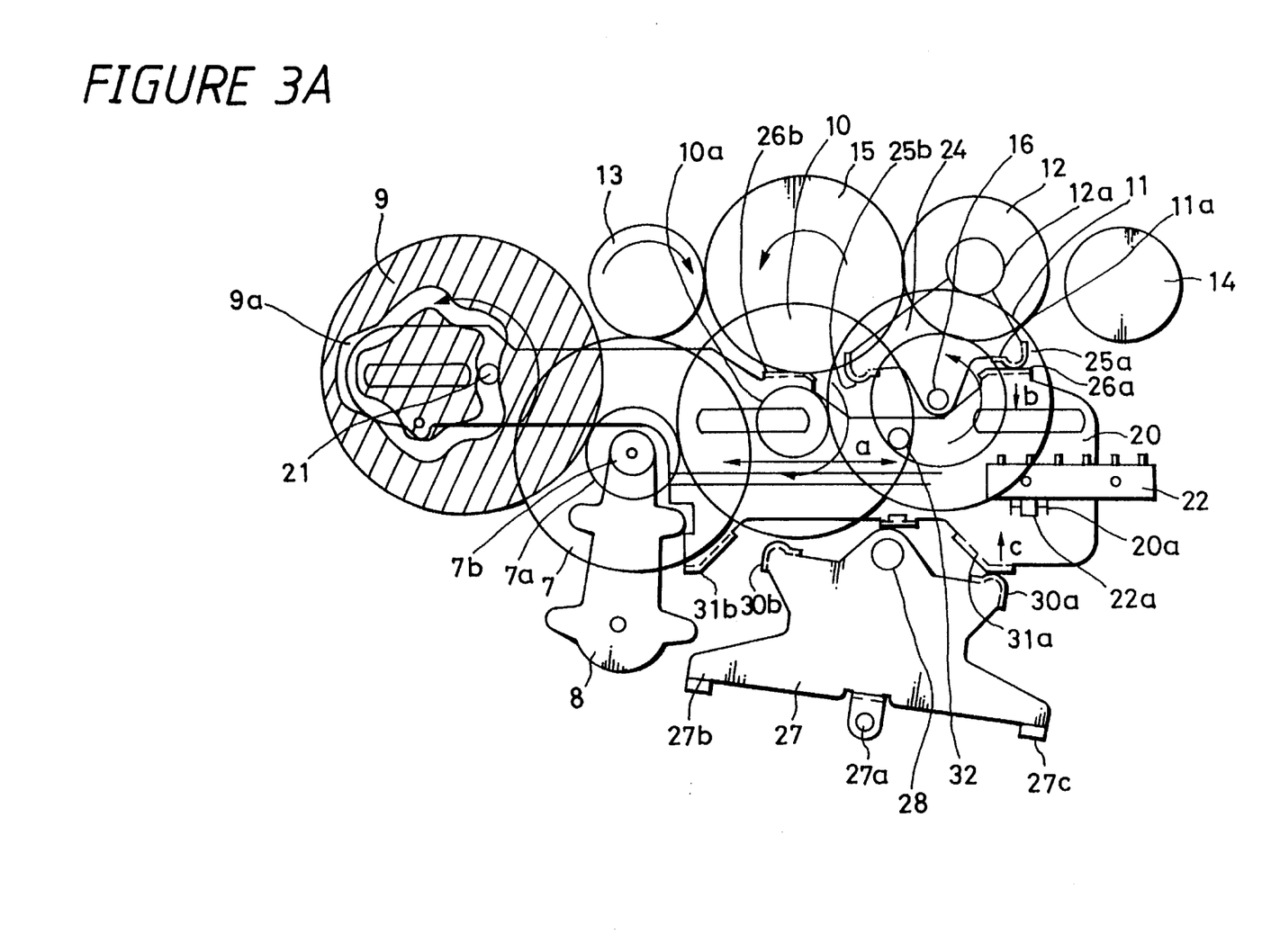
FIGS. 3A through 3D are enlarged plan views illustrative of the manner in which the mode selector mechanism operates, i.e., showing the mode selector mechanism in a forward playback (FWD) mode, a reverse playback (REV) mode, a fast-forward (FF) mode, and a rewinding (REW) mode, respectively.

The positions of the various parts in the FWD, REV, FF, REV modes selected by the mode selector lever 20 will be described below with reference to FIGS. 3A through 3D. In the FWD mode which is shown in FIG. 3A, the mode selector lever 20 is in the rightmost position. In this position, the pressable edge 25a of the first operating lever 24 is pressed by the inclined edge of the pressing edge member 26a of the mode selector lever 20, and hence the first operating lever 24 is inclined to the left about the pivot shaft 16. Therefore, the movable gear 12 is in mesh with the transmission gear 15 associated with the takeup hub shaft. At the same time, the pressable edge 30a of the second operating lever 27 is pressed by the inclined edge of the pressing edge member 31a of the mode selector lever 20, and the second operating lever 27 is inclined to the left about the pivot shaft 28 in symmetrical relationship to the first operating lever 24. The central pressing member 27a presses the magnetic head in a direction to press the magnetic tape in the tape cassette loaded in the cassette tape recorder, and the left-hand pressing member 27b presses the FWD pinch roller against the FWD capstan.

In this FWD mode, the tapered projection 32 on the mode selector lever 20 does not engage the ridge 33 on the auxiliary gear 11a. Therefore, the speed-change gear 11 and the auxiliary gear 11a are held in the lowered position under the resiliency of the compression coil spring 19 as shown in FIG. 7A.

Figure 3B:
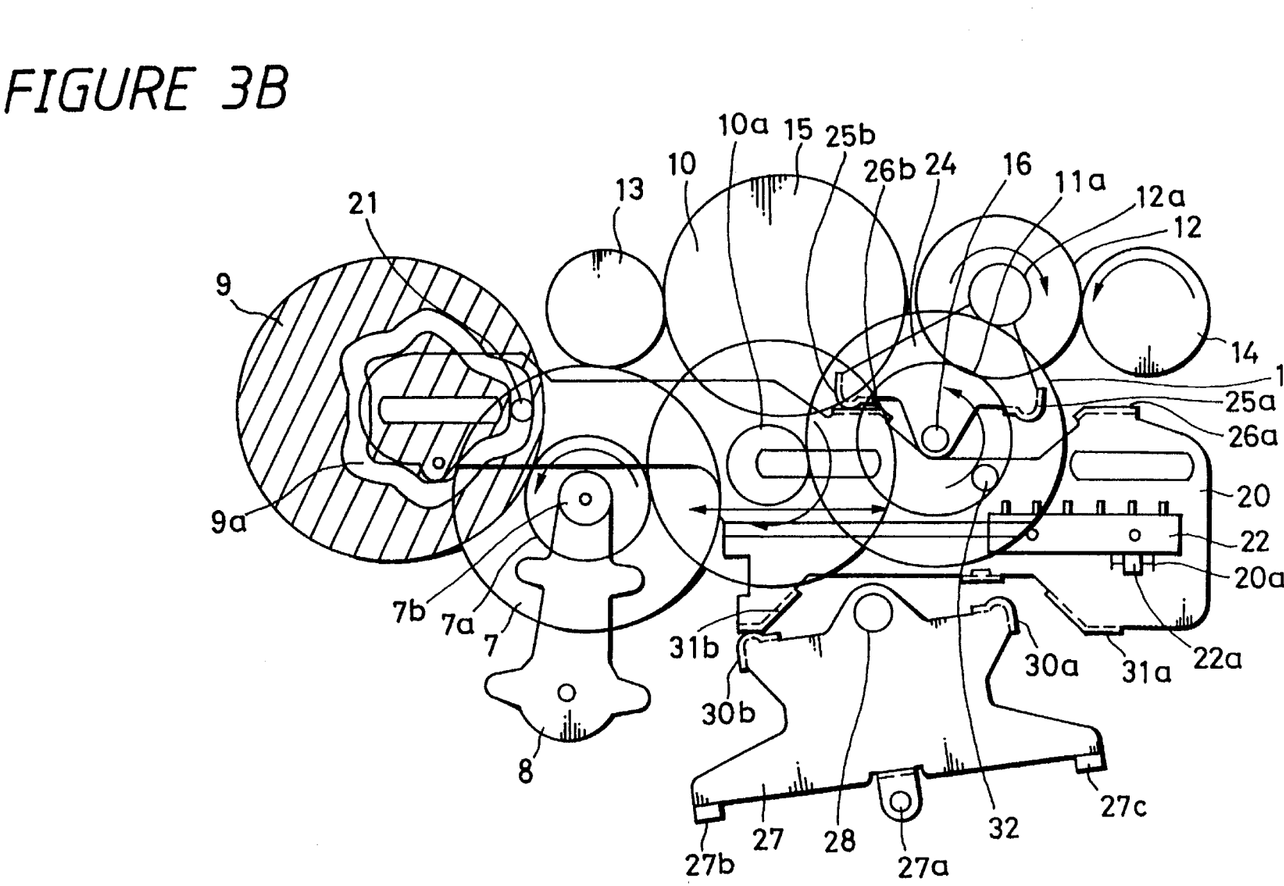

In the REV mode which is shown in FIG. 3B, the mode selector lever 20 is in the leftmost position. In this position, the pressable edge 25b of the first operating lever 24 is pressed by the inclined edge of the pressing edge member 26b of the mode selector lever 20, and hence the first operating lever 24 is inclined to the right about the pivot shaft 16. Therefore, the movable gear 12 is in mesh with the gear 14 associated with the supply hub shaft. At the same time, the pressable edge 30b of the second operating lever 27 is pressed by the inclined edge of the pressing edge member 31b of the mode selector lever 20, and the second operating lever 27 is inclined to the right about the pivot shaft 28 in symmetrical relationship to the first operating lever 24. The central pressing member 27a presses the magnetic head in the direction to press the magnetic tape in the tape cassette, and the right-hand pressing member 27c presses the REV pinch roller against the REV capstan.

In the REV mode, as with the FWD mode, the tapered projection 32 on the mode selector lever 20 does not engage the ridge 33 on the auxiliary gear 11a. Therefore, the speed-change gear 11 and the auxiliary gear 11a are held in the lowered position under the resiliency of the compression coil spring 19 as shown in FIG. 7A.

Figure 3C:
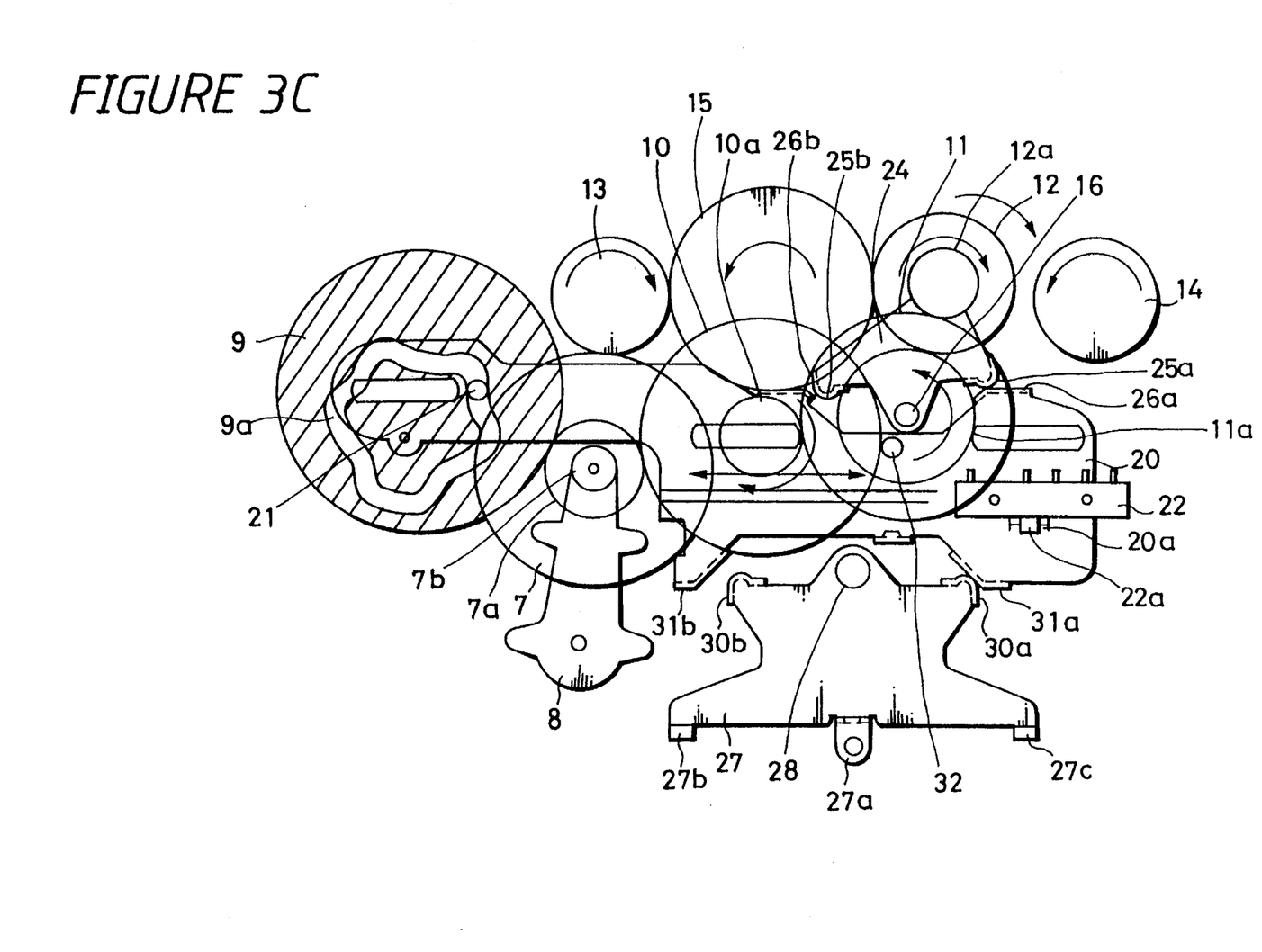

In the FF mode which is shown in FIG. 3C, the mode selector lever 20 is in a position which is slightly leftward of its neutral position. In the position shown in FIG. 3C, the pressable edge 25a of the first operating lever 24 is pressed by the inclined edge of the pressing edge member 26a of the mode selector lever 20, and hence the first operating lever 24 is inclined to the left about the pivot shaft 16. Therefore, the movable gear 12 is in mesh with the transmission gear 15 associated with the takeup hub shaft.

In the FF mode, the tapered projection 32 on the mode selector lever 20 engages the ridge 33 on the auxiliary gear 11a. Therefore, the speed-change gear 11 and the auxiliary gear 11a are lifted against the resiliency of the compression coil spring 19 as shown in FIG. 7B.

Figure 3D:
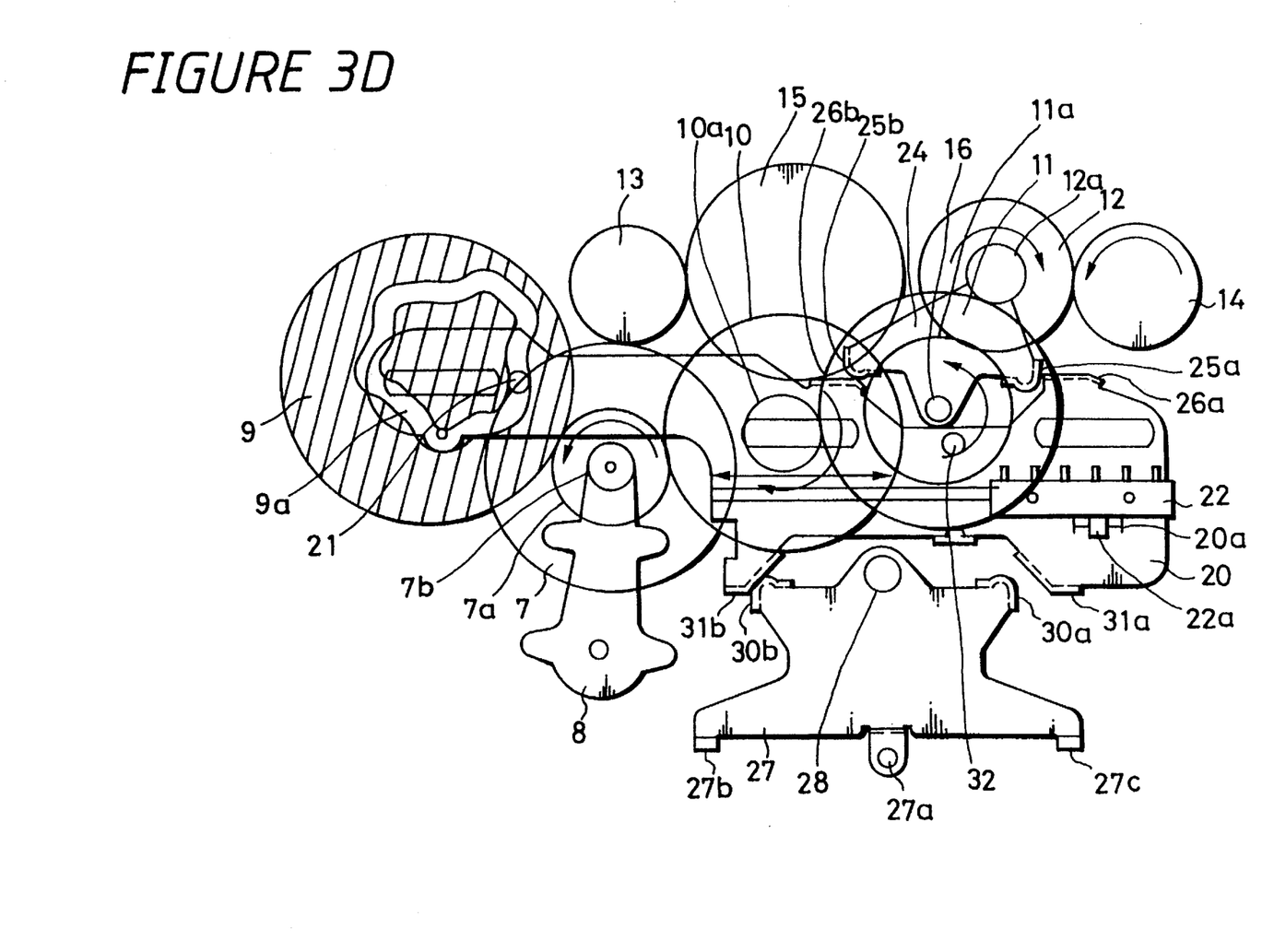

In the REW mode which is shown in FIG. 3D, the mode selector lever 20 is in a position which is slightly rightward of its neutral position. In the position shown in FIG. 3D, the pressable edge 25b of the first operating lever 24 is pressed by the inclined edge of the pressing edge member 26b of the mode selector lever 20, and hence the first operating lever 24 is inclined to the right about the pivot shaft 16. Therefore, the movable gear 12 is in mesh with the gear 14 associated with the supply hub shaft.

In the REW mode, as with the FF mode, the tapered projection 32 on the mode selector lever 20 engages the ridge 33 on the auxiliary gear 11a. Therefore, the speed-change gear 11 and the auxiliary gear 11a are lifted against the resiliency of the compression coil spring 19 as shown in FIG. 7B.

In the FF mode, as shown in FIG. 3C, the engaging edge member 31a of the mode selector lever 20 is held in contact with, but does not press, the pressable edge 30a of the second operating lever 27. At the same time, the engaging edge member 31b of the mode selector lever 20 is spaced a certain gap from the pressable edge 30a of the second operating lever 27. As a result, the second operating lever 27 is not angularly moved, and hence the magnetic head and the pinch rollers are not moved.

In the REW mode, as shown in FIG. 3D, the engaging edge member 31a of the mode selector lever 20 is spaced a certain gap from the pressable edge 30a of the second operating lever 27. At the same time, the engaging edge member 31b of the mode selector lever 20 is held in contact with, but does not press, the pressable edge 30b of the second operating lever 27. Consequently, as with the FF mode, the second operating lever 27 is not angularly moved, and hence the magnetic head and the pinch rollers are not moved.

The mode selector mechanism is of such a structure that the mode selector lever 20 is not positionally displaced from any of the positions corresponding to the respective FWD, REV, FF, and REW modes when the mode selector lever 20 has been shifted to these positions.

More specifically, when the FWD mode, for example, is selected, the pressable edges 25a, 30a of the first and second operating levers 24, 27 are moved beyond the inclined edges of the respective pressing edge members 26a, 31a and stopped in contact with edge portions thereof that lie parallel to the direction indicated by the arrow a in which the mode selector lever 20 is slidable, as shown in FIG. 3A. Therefore, when forces are applied from the first and second operating levers 24, 27 to the mode selector lever 20, the applied forces act in the directions indicated by the arrows b, c perpendicular to the direction indicated by the arrow a. Since no forces act in the direction indicated by the arrow a, the mode selector lever 20 is prevented from sliding accidentally.

Figure 4:
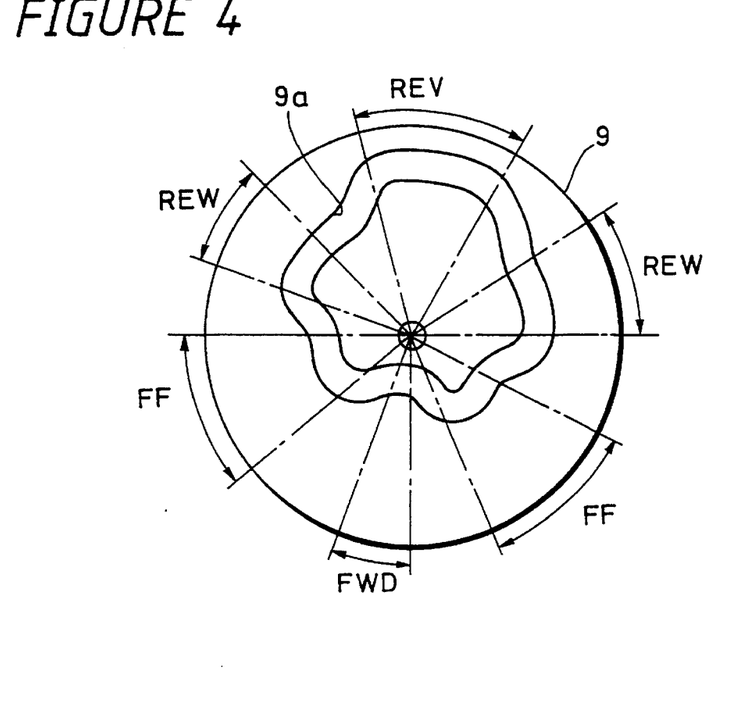
FIG. 4 is a diagram showing a cam gear.
Figure 5:
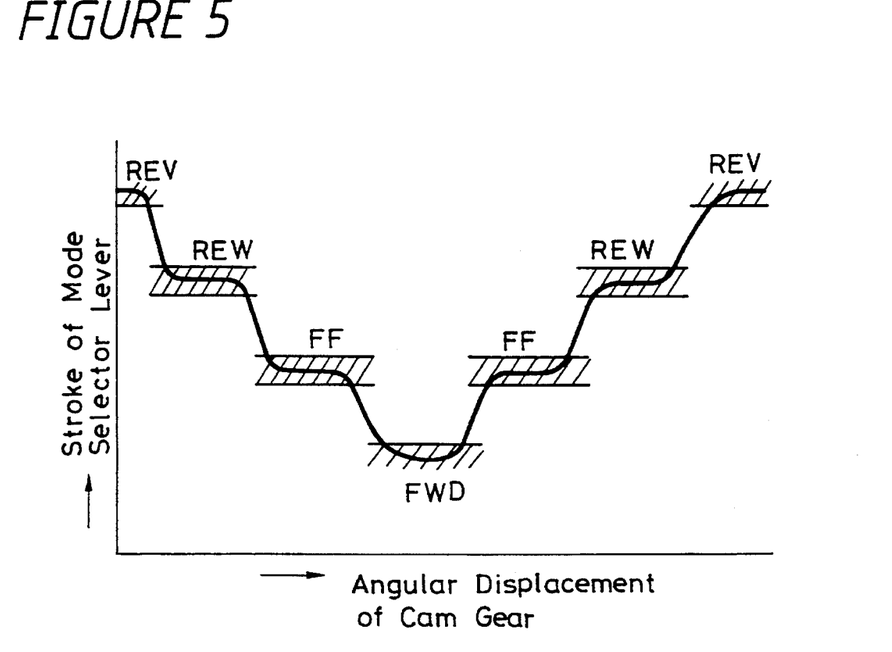
FIG. 5 is a diagram showing the profile of a cam groove of the cam gear.

The cam groove 9a of the cam gear 9 has a cam profile as shown in FIG. 4. According to the cam profile of the cam groove 9a, the stroke of the mode selector lever 20 as it is slid by the cam groove 9a varies as shown in FIG. 5 when the cam gear 9 rotates. In FIG. 5, the vertical axis represents the stroke of the mode selector lever 20 and the horizontal axis represents the angular displacement of the cam gear 9. As shown in FIG. 5, the mode selector lever 20 remains at rest in certain angular ranges, i.e., idle angular ranges, of the cam gear 9 as indicated by hatched lines when the cam gear 9 rotates in each of the FWD, REV, FF, and REW modes. The idle angular ranges are positioned in the cam groove 9a at portions thereof which correspond respectively to the FWD, REV, FF, and REW modes. In the mode selector mechanism according to the present invention, the cam gear 9 stops rotating as described above, thus keeping the mode selector lever 20 at rest in those idle angular ranges thereof.

Therefore, the mode selector lever 20 can be stopped accurately in each of the positions corresponding to the respective FWD, REV, FF, and REW modes. In those positions, the cam gear 9 is prevented from being rotated even if forces are applied from the mode selector lever 20 to the cam gear 9. As a consequence, the mode selector lever 20 is prevented from being accidentally slid and positionally displaced.

Inasmuch as the mode selector lever 20 is prevented from being positionally displaced in each of the FWD, REV, FF, and REW modes, the components of the mode selector mechanism are kept stably in position in each of the FWD, REV, FF, and REW modes.

After each of the FWD, REV, FF, and REW modes has been selected in response to rotation of the cam gear 9, the motor 2 is energized to rotate its shaft in the normal direction to move the movable gear 7 out of mesh with the cam gear 9 into mesh with the transmission gear 10 for rotating the corresponding hub shaft in the selected mode.

Specifically, in the FWD and FF modes, the rotation of the motor 2 is transmitted through the belt 6, the flywheel 4, the movable gear 7, the transmission gear 10, the speed-change gear 11, the movable gear 12, and the transmission gear 15 to the gear 13 that is associated with the takeup hub shaft, which is then rotated. In the FWD mode, the speed-change gear 11 is in the lowered position as shown in FIG. 7A, with the auxiliary gear 11a meshing with the movable gear 12. In the FF mode, the speed-change gear 11 is in the lifted position as shown in FIG. 7B, with the speed-change gear 11 meshing with the small-diameter gear 12a. Because of the different gear ratios, the takeup hub shaft is rotated faster in the FF mode than in the FWD mode.

In the REV and REW modes, the rotation of the motor 2 is transmitted through the belt 6, the flywheel 4, the movable gear 7, the transmission gear 10, the speed-change gear 11, and the movable gear 12 to the gear 14 that is associated with the supply hub shaft, which is then rotated. In the REV mode, the speed-change gear 11 is in the lowered position as shown in FIG. 7A, with the auxiliary gear 11a meshing with the movable gear 12. In the REW mode, the speed-change gear 11 is in the lifted=position as shown in FIG. 7B, with the speed-change gear 1! meshing with the small-diameter gear 12a. Because of the different gear ratios, the supply hub shaft is rotated faster in the REW mode than in the REV mode.

As described above, the tape transport mechanism of the cassette tape recorder is arranged to prevent the mode selector lever 20 from being positionally displaced from each of the positions corresponding to the FWD, REV, FF, and REW modes. The mode selector mechanism does not require mechanism components including a lock lever and a return spring which would otherwise be needed to prevent the mode selector lever from being positionally displaced. Thus, the mode selector mechanism is constructed of a relatively small number of parts, inexpensive due to fewer parts used, and manufactured in a reduced number of manufacturing steps. Since the mode selector mechanism is relatively simple in structure, it is less likely to fail in operation, and hence is highly reliable.

The speed-change gear 11 is vertically moved, i.e., lifted and lowered, by the conical tapered projection 32 on the mode selector lever 20 in response to sliding movement of the mode selector lever 20, for thereby changing speeds of rotation of the movable gear 12. Inasmuch as no special separate mechanism is required to lift and lower the speed-change gear 11, the mode selector mechanism is further simplified in structure. Therefore, the number of parts of the mode selector mechanism is reduced, and the number of manufacturing steps required to manufacture the mode selector mechanism is also reduced.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A mode selector mechanism for use in a recording and/or reproducing apparatus, comprising:

a chassis;

a mode selector lever stoppable in a position corresponding to a selected one of a plurality of operating modes of said apparatus;

a tape transport assembly switchable between settings corresponding to the operating modes, said tape transport assembly comprising a transmission gear mounted on said chassis;

a speed change gear mounted on said chassis and engageable with said transmission gear; and a first movable gear swingably mounted on said chassis for engagement with said speed change gear and one of a take-up reel and a supply reel;

a rotatable cam gear for moving said mode selector lever in a first direction to the position corresponding to said selected one of the operating modes;

an operating mechanism angularly movable in response to movement of said mode selector lever for switching between the operating modes, and preventing said mode selector lever from moving in a second direction perpendicular to said first direction in which said mode selector lever moves;

a motor for producing drive forces to be supplied to said cam gear and to said tape transport assembly; and a drive selecting mechanism comprising a flywheel mounted on said chassis;

a belt connecting said motor and said flywheel;

a flywheel gear mounted on said flywheel; and a second movable gear swingably mounted on said chassis for engagement with said flywheel gear and one of said cam gear and said transmission gear of said tape transport assembly, wherein the drive forces from said motor are supplied to said cam gear when said motor rotates in a first rotary direction and to said tape transport assembly when said motor rotates in a second rotary direction.

2. A mode selector mechanism according to claim 1, wherein said operating mechanism comprises a first operating lever and a second operating lever which are positioned one on each side of said mode selector lever such that forces applied from said first and second operating levers to said mode selector lever are directed substantially perpendicularly to said first direction in which said mode selector lever moves and wherein said first movable gear is rotatably mounted on said first operating lever.

3. A mode selector mechanism according to claim 1, wherein said cam gear comprises a cam groove operatively engaging said mode selector lever for selectively moving the mode selector lever to positions corresponding to the respective operating modes, said cam groove having a plurality of idle ranges for preventing said mode selector lever from moving in response to rotation of said cam gear when said mode selector lever is in any of the positions corresponding to the respective operating modes.

4. A mode selector mechanism according to claim 3, wherein said idle ranges are positioned in said cam groove at portions thereof which correspond to the respective operating modes.

5. A mode selector mechanism according to claim 1, wherein said tape transport assembly further comprises lifting/lowering means for lifting and lowering said speed-change gear to select one of the operating modes in response to movement of said mode selector lever.

6. A mode selector mechanism according to claim 5, wherein said lifting/lowering means comprises a first projection formed on said mode selector lever and a second projection formed on said speed-change gear for engagement with said first projection.

7. A mode selector mechanism for use in a recording and/or reproducing apparatus, comprising:

a chassis;

a tape transport assembly comprising a transmission gear mounted on said chassis;

a speed change gear mounted on said chassis and engageable with said transmission gear; and a first movable gear swingably mounted on said chassis for engagement with said speed change gear and one of a take-up reel and a supply reel, wherein said tape transport assembly is switchable between settings corresponding to a plurality of operating modes and said tape transport assembly is operable in a selected one of said plurality of operating modes including at least a forward playback mode, a fast-forward mode, and a rewinding mode;

a mode selector lever movable in a direction between positions corresponding respectively to said operating modes and stoppable in a position corresponding to the selected one of the operating modes, said speed-change gear being vertically movable in response to movement of said mode selector lever;

a rotatable cam gear having a cam groove for moving said mode selector lever to the position corresponding to the selected one of the operating modes, said cam groove having a plurality of idle ranges for preventing said mode selector lever from moving in response to rotation of said cam gear when said mode selector lever is in any of the positions corresponding to the respective operating modes;

an operating mechanism angularly movable in response to movement of said mode selector lever for switching between the operation modes depending on the selected one of the operating modes, said operating mechanism having a first operating lever and a second operating lever which are angularly movable and positioned one on each side of said mode selector lever such that forces applied from said first and second operating levers to said mode selector lever are directed substantially perpendicularly to said direction in which said mode selector lever moves;

a motor for producing drive forces to be supplied to said cam gear and to said tape transport assembly; and a drive selecting mechanism comprising a flywheel mounted on said chassis;

a belt connecting said motor and said flywheel;

a flywheel gear mounted on said flywheel; and a second movable gear swingably mounted on said chassis for engagement with said flywheel gear and one of said cam gear and said transmission gear of said tape transport assembly, wherein the drive forces from said motor are supplied to said cam gear when said motor rotates in a first rotary direction and to said tape transport assembly when said motor rotates in a second rotary direction.

8. A mode selector mechanism for use in a recording and/or reproducing apparatus, comprising:

a chassis;

a tape transport assembly switchable between settings corresponding to a plurality of operating modes and operable in a selected one of said plurality of operating modes of said apparatus including at least a forward playback mode, a fast-forward mode, and a rewinding mode, said tape transport assembly comprising
a transmission gear mounted on said chassis;
a speed change gear mounted on said chassis and engageable with said transmission gear; and
a first movable gear swingably mounted on said chassis for engagement with said speed change gear and one of a take-up reel and a supply reel;

a mode selector lever stoppable in a position corresponding to the selected one of the operating modes;

a cam gear for moving said mode selector lever in a first direction to the position corresponding to the selected one of the operating modes;

an operating mechanism angularly movable in response to movement of said mode selector lever for switching between the operating modes of said tape transport assembly of said apparatus depending on the selected one of the operating modes, and preventing said mode selector lever form moving in a second direction perpendicular to said first direction in which said mode selector lever moves;

a motor for producing drive forces to be supplied to said tape transport assembly and to said cam gear; and a drive selecting mechanism for supplying the drive forces from said motor to said cam gear when said motor rotates in a first rotary direction and to said tape transport assembly when said motor rotates in a second rotary direction, said selecting mechanism comprising
a flywheel mounted on said chassis;
a belt connecting said motor and said flywheel;
a flywheel gear mounted on said flywheel; and
a second movable gear swingably mounted on said chassis for engagement with said flywheel gear and one of said cam gear and said transmission gear of said tape transport assembly, wherein said second movable gear engages said cam gear in response to a rotation of said motor in said first rotary direction when one of the operating modes is selected, thereby to move said mode selector lever to the position corresponding to the selected one of the operating modes to cause said operating mechanism to select the selected one of the operating modes, and subsequently said second movable gear engages said transmission gear of said tape transport assembly to supply the drive forces to the tape transport assembly in response to rotation of said motor in said second rotary direction after the selected one of the operating modes has been selected.

* * * * *